United States Patent [19]

Gellert

[11] Patent Number: 5,238,378
[45] Date of Patent: Aug. 24, 1993

[54] COINJECTION MOLDING APPARATUS HAVING ROTARY AXIAL ACTUATING MECHANISM

[76] Inventor: Jobst U. Gellert, 7A Prince Street, Georgetown, Ontario, Canada, L7G 2X1

[21] Appl. No.: 889,132

[22] Filed: May 27, 1992

[30] Foreign Application Priority Data

May 11, 1992 [CA] Canada .................. 2068543

[51] Int. Cl.⁵ .......................................... B29C 45/23
[52] U.S. Cl. .................. 425/130; 264/40.7; 264/328.9; 425/146; 425/564; 425/566
[58] Field of Search .............. 425/130, 562, 564, 566, 425/573, 549, 146; 264/328.9, 40.7

[56] References Cited

U.S. PATENT DOCUMENTS

| | | | |
|---|---|---|---|
| 3,947,177 | 3/1976 | Eckardt | 425/130 |
| 4,657,496 | 4/1987 | Ozeki et al. | 425/130 |
| 4,789,318 | 12/1988 | Ehritt | 425/130 |
| 4,917,594 | 4/1990 | Gellert et al. | 425/549 |

FOREIGN PATENT DOCUMENTS 8900655  4/1990  Netherlands .

*Primary Examiner*—Tim Heitbrink
*Attorney, Agent, or Firm*—Dalesman & Company

[57] ABSTRACT

Valve gated injection molding apparatus for coinjecting and/or sequentially injecting two different fluids through a gate into a cavity. An elongated valve pin member is received in an elongated valve sleeve member in alignment with the gate and both are reciprocated rotatably as well as axially by separate actuating mechanisms to control the flow of the fluids through the gate. Each actuating mechanism has a piston driven rack member to provide rotary motion which is then converted to axial movement of the corresponding valve member between the retracted open and forward closed positions. In one embodiment, helical threads on the valve members engage fixed teeth extending inwardly from the surrounding nozzle to convert the rotary motion of each valve member to corresponding axial movement. Linear position transducers on the rack members provide for accurate control of the valve members. This accurate control and the reduction in force required by these rotary axial actuating mechanisms minimizes wear resulting from repeated seating of the valve members.

9 Claims, 4 Drawing Sheets

COINJECTION MOLDING APPARATUS HAVING ROTARY AXIAL ACTUATING MECHANISM

BACKGROUND OF THE INVENTION

This invention relates generally to injection molding apparatus having a valve pin member extending in a valve sleeve member, and more particularly to improved apparatus for reciprocating them axially to control the flow of two different fluids through a gate into a cavity.

It is well known in the art to coinject two different plastic melts at the same time and it is also known to sequentially inject them one after the other. U.S. Pat. No. 4,917,594 to Gellert et al which issued Apr. 17, 1990 shows valve gated apparatus for injecting melt through the gate around a central stream of air.

In the past, control of the flow of two or more fluids through the gate into the cavity has been provided by rotating a valve pin member to align different fluid channels and/or by axially reciprocating a valve pin member and one or more valve sleeve members between retracted open and forward closed positions. In U.S. Pat. No. 4,789,318 to Ehritt which issued Dec. 6, 1988, the valve pin member is rotated between different positions to provide coinjection and sequential injection molding. U.S. Pat. No. 4,657,496 to Ozeki et al which issued Apr. 14, 1987 shows reciprocating a valve pin member and valve sleeve member axially to provide sequential injection of two different melts. Netherlands patent application Ser. No. 8900655 to Stork Plastics Machinery B.V. published Apr. 2, 1990 discloses actuating a hollow valve pin member and a valve sleeve member axially to coinject two separate melts around a central stream of air. U.S. Pat. No. 3,947,177 to Eckardt which issued Mar. 30, 1976 describes axially actuating two valve sleeve members and a valve pin member to control coinjection of three separate melts. In these previous arrangements, the valve pin member and valve sleeve member are actuated directly by pneumatic or hydraulic pistons. This has the disadvantages that there is no provision for fine adjustment of the gate opening and closing or accurate control of its timing.

SUMMARY OF THE INVENTION

Accordingly, it is an object of the present invention to at least partially overcome the problems of the prior art by providing actuating mechanism to axially reciprocate each of the valve pin member and the valve sleeve member which requires less force to drive and is more accurate to control.

To this end, in one of its aspects, the invention provides valve gated hot runner injection molding apparatus having a nozzle received in a mold, the nozzle having a longitudinal bore leading to a gate extending through the mold to a cavity, first and second separate fluid channels extending to convey first and second fluids from first and second fluid sources through the nozzle to the gate, an elongated hollow valve sleeve member received in the longitudinal bore of the nozzle, the valve sleeve member being axially reciprocable in the longitudinal bore between a retracted position wherein the first fluid channel is open and a forward position wherein the first fluid channel is closed, an elongated valve pin member received in the hollow valve sleeve member, the valve pin member being axially reciprocable in the valve sleeve member between a retracted position wherein the second fluid channel is open and a forward position wherein the second fluid channel is closed, having the improvement wherein the apparatus comprises first actuating mechanism which reciprocates the valve sleeve member rotatably and axially between the retracted open position and the forward closed position according to a predetermined cycle, and second actuating mechanism which reciprocates the valve pin member rotatably and axially between the retracted open position and the forward closed position according to the predetermined cycle.

Further objects and advantages of the invention will appear from the following description taken together with the accompanying drawings.

DETAILED DESCRIPTION OF THE INVENTION

Figure 1:
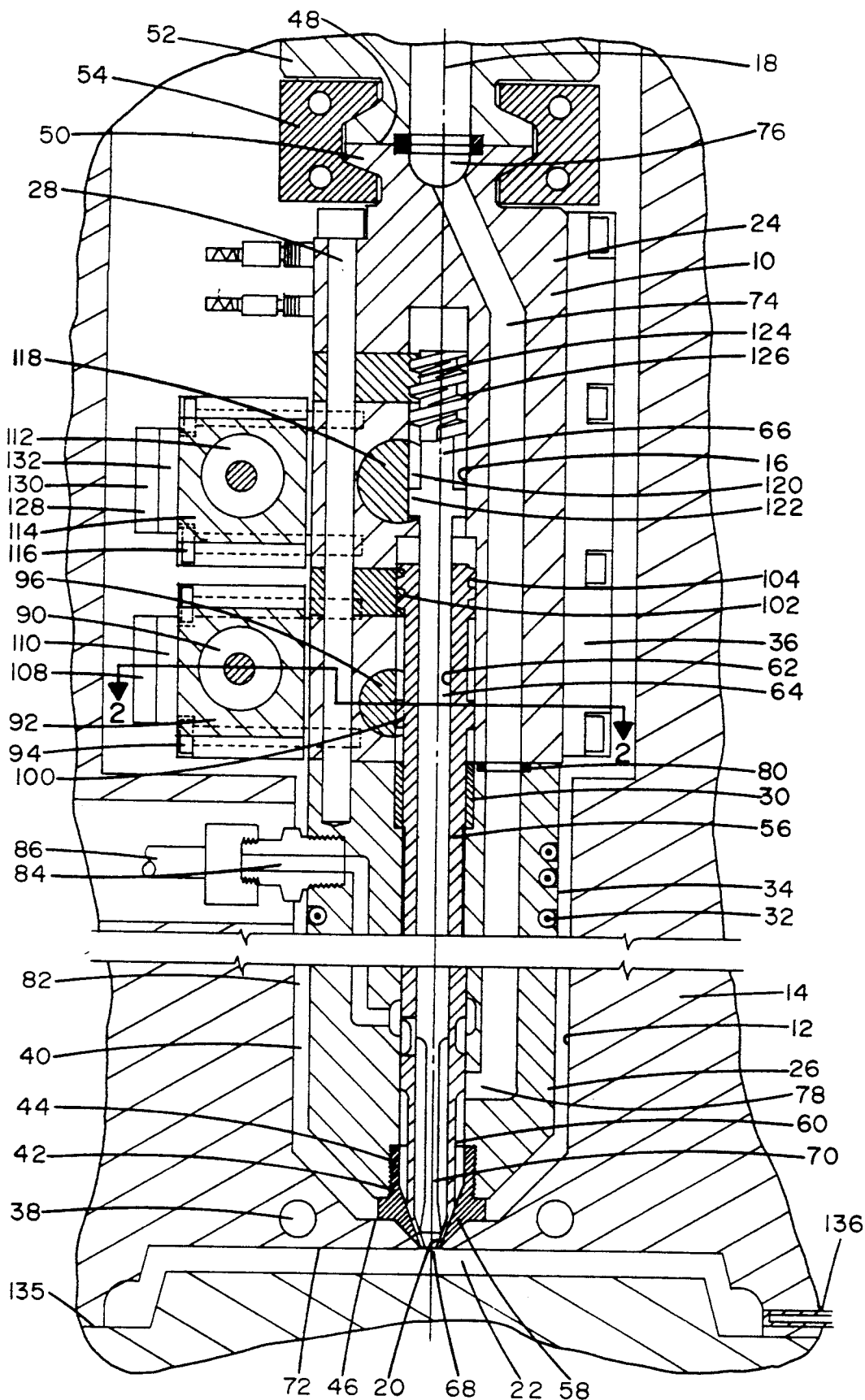
FIG. 1 is a partial sectional view of a portion of an injection molding system having apparatus according to one embodiment of the invention showing both the valve pin member and the valve sleeve member in the closed positions.

Reference is first made to FIG. 1 which shows a valve gated injection molding system or apparatus having an elongated heated nozzle 10 received in a well 12 in a cooled mold 14. The nozzle 10 has a longitudinal bore 16 extending along a central axis 18 in alignment with a gate 20 leading to a cavity 22. The nozzle 10 is made of steel with a rear portion 24 and a forward portion 26 which are tightly secured together by bolts 28. A replaceable cylindrical bushing 30 is seated around the longitudinal bore 16 to avoid wear in the nozzle 10. The forward portion 26 of the nozzle 10 is heated by an electrical heating element 32 which is integrally brazed into a channel in its outer surface 34, and the rear portion 24 of the nozzle 10 is heated by an electrical heater plate 36. The mold 14 is cooled by pumping cooling water through cooling conduits 38, and the heated nozzle 10 is separated from the surrounding cooled mold 14 by an insulative air gap 40. The air gap 40 is bridged by a nozzle seal or gate insert 42 which is screwed into a threaded seat 44 in the forward end 46 of the nozzle 10 and forms the gate 20 leading to the cavity 22. The nozzle 10 has a rear end 48 with a flange 50 which is secured to a heated machine nozzle 52 extending from a molding machine (not shown) by a split clamp 54. While the system shown has only a single cavity 22, the invention applies equally to multi-cavity systems having melt distribution manifolds to convey melt to an arrangement of different nozzles.

An elongated hollow steel valve sleeve member 56 is received in the longitudinal bore 16. The valve sleeve member 56 has a forward end 58 which tapers inwardly and a forward portion 60 with a reduced outer diameter adjacent its forward end 58. The valve sleeve member 56 fits in the longitudinal bore 16 and has actuating mechanism according to the invention which is described in detail below to reciprocate it rotatably as well as axially between a retracted open position and a forward closed position wherein its forward end 58 is seated in the tapered gate 20 through the gate insert 42. The inner diameter 62 of the valve sleeve member 56 is uniform except that it also tapers inwardly at the forward end 58. An elongated valve pin member 64 which is received in the valve sleeve member 56 has a rear portion 66 which extends rearwardly from the valve sleeve member 56 and an inwardly tapered forward end 68. The valve pin member 64 fits in the inner diameter 62 of the valve sleeve member 56 and has a forward portion 70 with a reduced outer diameter adjacent its forward end 68. The valve pin member 64 also has an actuating mechanism according to the invention which is described in detail below to reciprocate it rotatably as well as axially between a retracted open position and a forward closed position wherein its forward end 68 is seated in the inwardly tapered forward end 58 of the valve sleeve member 56. As clearly seen in FIG. 1, the forward end 58 of the valve sleeve member 56 and the forward end 68 of the valve pin member 64 are aligned with the forward face of the gate insert 42 and with the near side 72 of the cavity 22.

Figure 3:
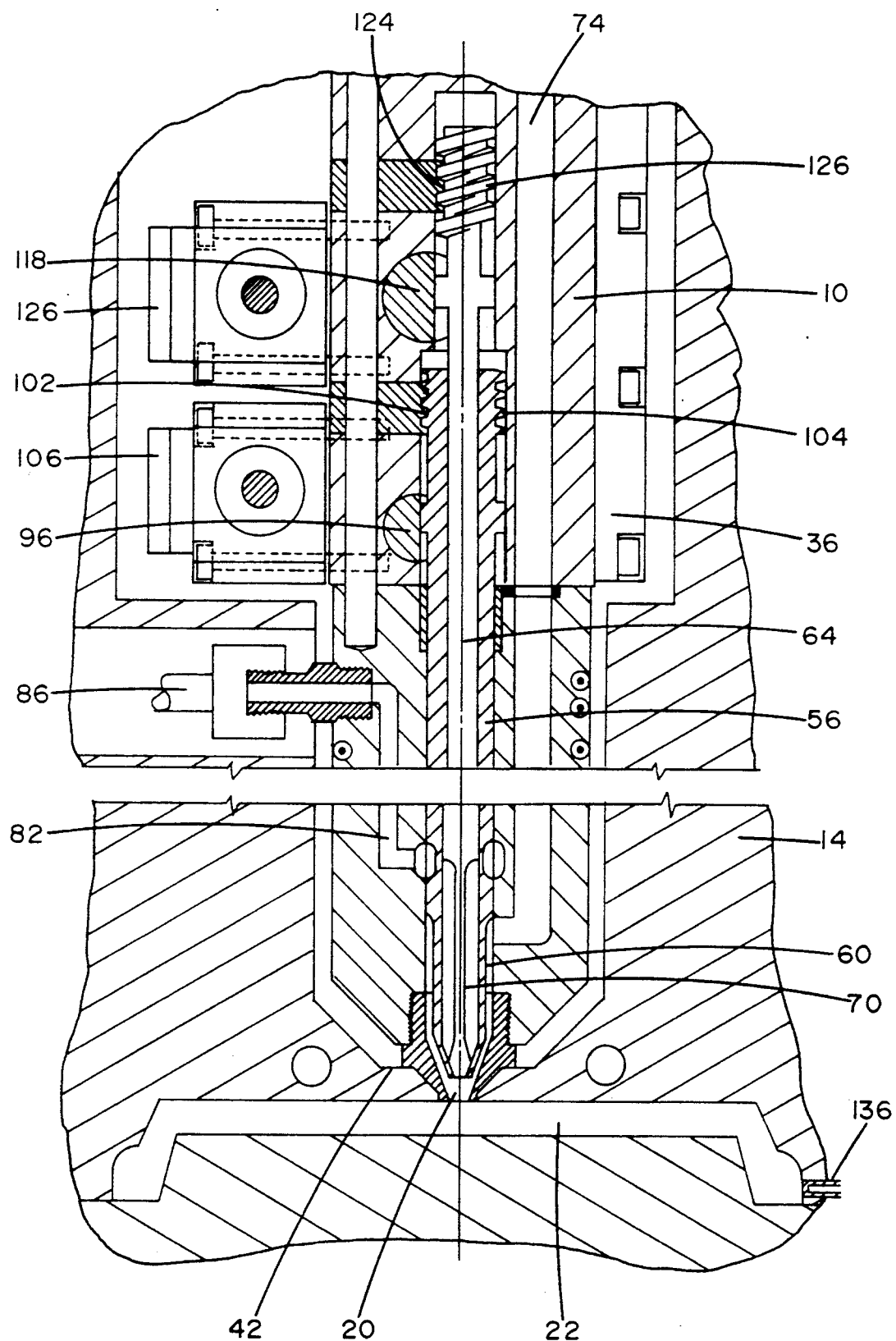
FIG. 3 is a sectional view similar to FIG. 1 showing the valve pin member in the closed position and the valve sleeve member in the open position.

A first fluid channel 74 for conveying melt received from the machine nozzle 52 extends through the nozzle 10 and the gate insert 42 to the gate 20. As can be seen, the first fluid channel 74 extends diagonally outward from an inlet 76 at the rear end 48 of the nozzle 10. It 15 then runs parallel to the longitudinal bore 16 and turns through a short radial portion 78 which extends inwardly to join the longitudinal bore 16. A circular seal 80 is seated around the first fluid channel 74 where the rear and forward portions 24, 26 abut to avoid leakage of the pressurized melt. As best seen in FIG. 3, the location of the radial portion 78 is determined to join the longitudinal bore 16 around the reduced diameter forward portion 60 of the valve sleeve member 56 when the valve sleeve member 56 is in the open position. Thus, the melt flows through the first fluid channel 74, around the forward portion 60 of the valve sleeve member 56 and through the gate 20 into the cavity 22.

Figure 4:
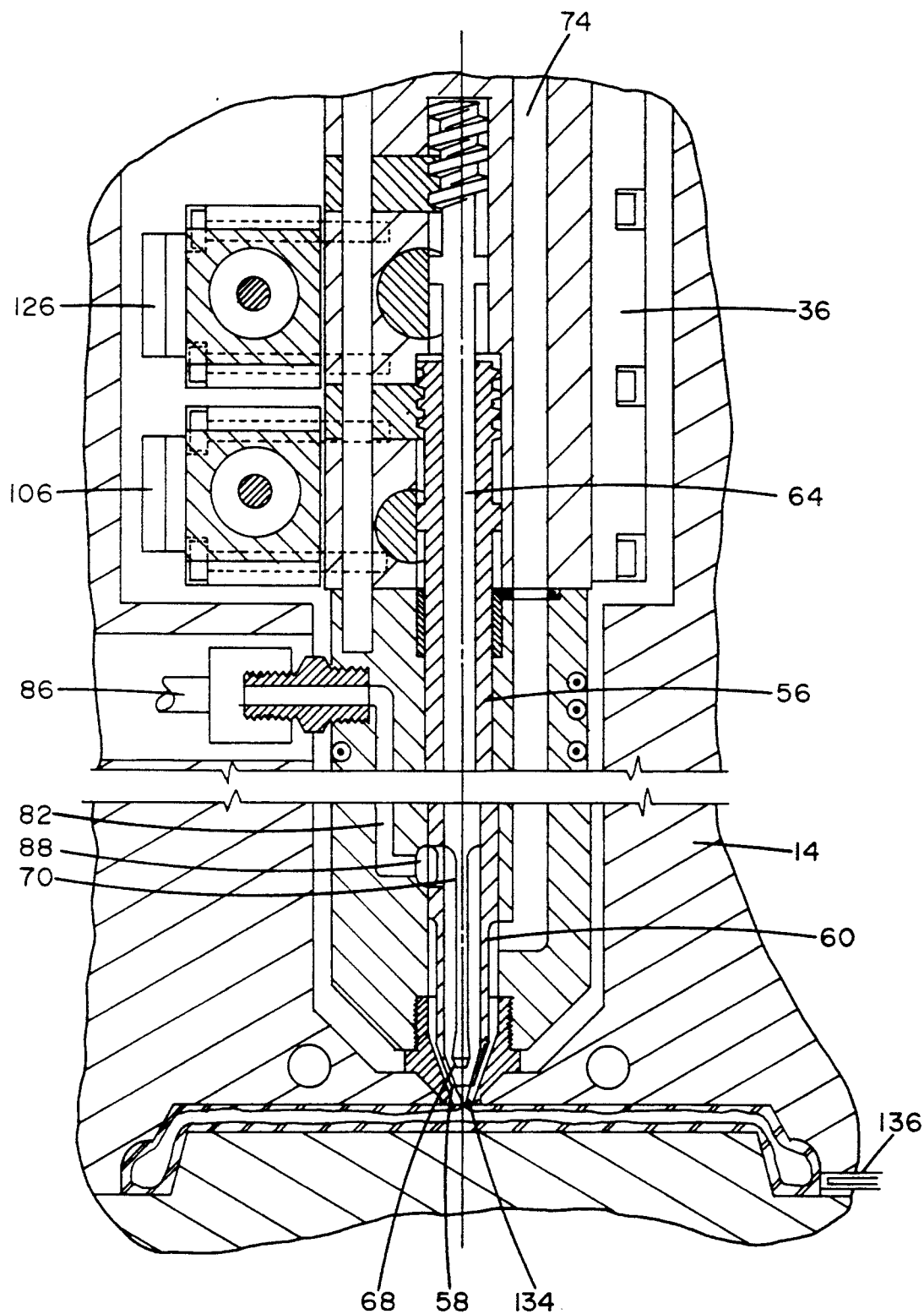
FIG. 4 is also a sectional view similar to FIG. 1 showing both the valve pin member and the valve sleeve member in the open positions.

A second fluid channel 82 extends through the nozzle 10 to the gate 20 from an inlet 84 on the side of the nozzle 10. In the embodiment shown, the second fluid channel 82 receives pressurized air from a controlled source through air line 86, but in other applications it receives pressurized melt supplied by an injection cylinder. As best seen in FIG. 4, the second fluid channel 82 extends inwardly to join the longitudinal bore 16 at a location in alignment with an opening 88 through the valve sleeve member 56 and around the reduced diameter forward portion 70 of the valve pin member 64 when both the valve sleeve member 56 and the valve pin member 64 are in the open positions.

Figure 2:
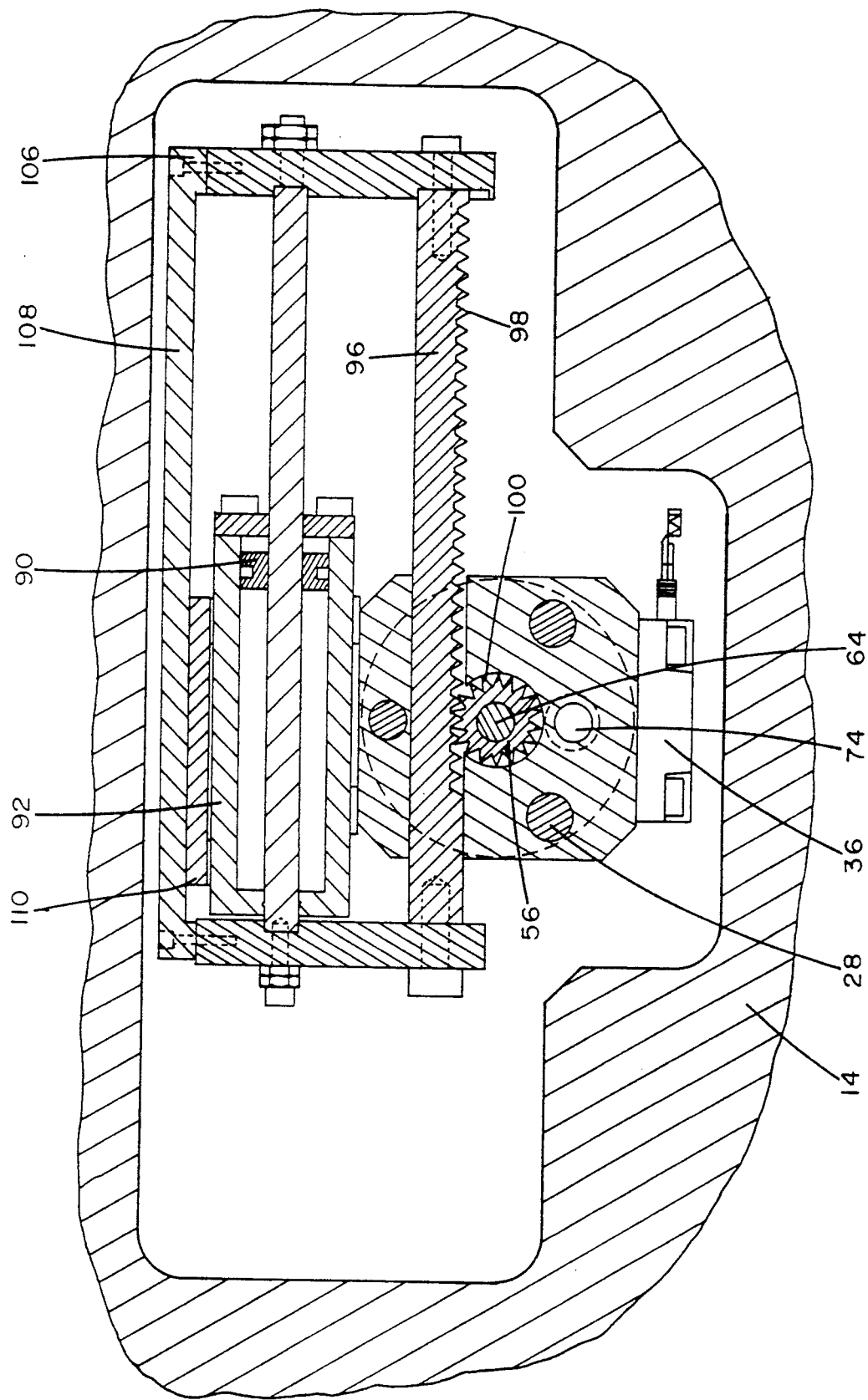
FIG. 2 is a partial sectional view taken along line 2—2 in FIG. 1.

Both the valve sleeve member 56 and the valve pin member 64 are rotated and axially reciprocated between their retracted open positions and forward closed positions according to a predetermined injection cycle by actuating mechanisms according to the invention which will now be described in detail. As is well known in the art, the timing of the injection cycle is controlled electronically and can be adjusted for different particular applications. The actuating mechanism for reciprocating the valve sleeve member 56 includes a double acting piston 90 in a hydraulic cylinder 92 which is mounted on the nozzle 10 by bolts 94. As best seen in FIG. 2, the piston 90 drives a rack member 96 having teeth 98 which engage spur teeth 100 extending around the valve sleeve member 56. The actuating mechanism also includes a fixed threaded half-nut 102 facing inwardly into the longitudinal bore 16 to engage a matching thread 104 extending helically around the valve sleeve member 56. Thus, when the piston 90 drives the rack member 96, it rotates the valve sleeve member 56. The engagement of the helical thread 104 by the fixed half-nut 102 produces a corresponding axial movement of the valve sleeve member 56. A first linear position transducer 106 has a moveable bar 108 connected to move with the rack member 96 and a fixed reading portion 110 mounted on the cylinder 92. The transducer 106 produces a signal which is used to accurately control movement of the piston 90 to alternately drive the rack member 96 in opposite directions. Thus, axial travel of the valve sleeve member 56 between the retracted open position and the forward closed position according to the injection cycle is very accurately controlled. This accurate control and the reduced force required by this actuating mechanism minimizes wear resulting from the valve sleeve member 56 repeatedly seating in the gate 20.

The actuating mechanism for reciprocating the valve pin member 64 is very similar to that shown in FIG. 2. It includes a double acting piston 112 in a hydraulic cylinder 114 which is also mounted on the nozzle 10 by bolts 116. The piston 112 drives a rack member 118 having teeth 120 which engage spur teeth 122 extending around the valve pin member 64. The valve pin member actuating mechanism also includes a fixed threaded half-nut 124 facing inwardly into the longitudinal bore 16 to engage a matching thread 126 extending helically around the valve pin member 64. The hydraulically driven piston 112 drives the rack member 118 which rotates the valve pin member. The engagement of the helical thread 126 by the half-nut 124 results in corresponding axial movement of the valve pin member 64. A second linear position transducer 128 has a moveable bar 130 connected to move with the rack member 118 and a fixed reading portion 132 mounted on the cylinder 114. When the rack member 118 moves, the second transducer 128 produces a signal which is used to accurately control movement of the piston 112 to alternately drive the rack member 118 in opposite directions according to the injection cycle. This, in turn, accurately controls axial reciprocation of the valve pin member 64 between the retracted open and forward closed positions. This accurate control and reduced force required by this rotary axial actuating mechanism similarly minimizes wear of the valve pin member 64 repeatedly seating in the valve sleeve member 56. While this embodiment has the half-nuts 102, 124 extending inwardly to engage the helical threads 104, 126, the half-nuts 102, 124 can be replaced by other arrangements of teeth or threads, or the positions of the half-nuts 102, 124 and the threads 104, 126 can be reversed. In another embodiment, the helical thread 126 around the valve pin member can engage teeth or a helical thread on the inner diameter 62 of the valve sleeve member 64 rather than the half-nut 124 to produce the axial motion. In other embodiments, various other arrangements of worm gears can be used to reciprocate the valve member 56, 64 rotatably as well as axially. Also, the pistons 90, 112 can be pneumatically driven rather than hydraulically driven.

In use, the system or apparatus is assembled as shown and electrical power is applied to the heating element 32 and heater plate 36 to heat the nozzle 10 to a predetermined operating temperature. Hydraulic pressure to the pistons 90, 112 and pressurized air or gas to air line 86 are controlled in conjunction with the molding machine which supplies pressurized melt according to the predetermined injection cycle by conventional valves and timing circuitry which are not shown. After hydraulic pressure has been applied to piston 90 to withdraw the valve sleeve member 56 from the forward closed position shown in FIG. 1 to the retracted open position shown in FIG. 3, hot pressurized plastic melt is injected by the molding machine. The melt flows through the first fluid channel 74, around the reduced diameter forward portion 60 of the retracted valve sleeve member 56, and through the gate 20 into the cavity 22. After a short period of time during which a predetermined amount of melt has entered the cavity 22, hydraulic pressure is applied to piston 112 to retract the valve pin member 64 from the closed position shown in FIG. 3 to the open position shown in FIG. 4. Pressurized air from line 86 flows through the second fluid channel 82, around the reduced diameter forward portion 70 of the valve pin member 64, through the tapered forward end 58 of the valve sleeve member and the gate 20 into the cavity 22. The pressurized air flows out of the forward end 50 of the valve sleeve member in a central stream 134 surrounded by the melt from the first fluid channel 74. This produces a melt bubble which expands until it contacts all around the sides of the cavity 22. Air pressure is released and then hydraulic pressure is reversed to the piston 90 to drive the valve sleeve member 56 forward to the closed position in which its tapered forward end 58 is seated in the gate 20. Melt injection pressure is then released, and after a short cooling period, hydraulic pressure to the piston 112 is reversed to drive the valve pin member 64 forward to the closed position shown in FIG. 1 in which its tapered forward end 68 is seated in the tapered forward end 58 of the valve sleeve member. Air pressure in the cavity 22 is relieved by puncturing the hollow part by a hollow needle 136 mounted to reciprocate in the mold 14 as known in the art. The mold 14 is then opened along the parting line 138 to eject the hollow molded product. After ejection, the mold is closed and the cycle is repeated continuously with a frequency dependent upon the size of the cavity and the type of material being molded. In addition to improving control of the gate opening, rotating the valve members 56, 64 has the advantage that the twisting motion reduces the chances of jamming due to corrosive material or overheating.

While the description of the invention has been given with respect to preferred embodiments, it will be evident that various modifications are possible without departing from the scope of the invention as understood by those skilled in the art and as defined in the following claims.

The embodiments of the invention in which an exclusive property or privilege is claimed are defined as follows:

1. In a valve gated hot runner injection molding apparatus having a nozzle received in a mold, the nozzle having a longitudinal bore leading to a gate extending through the mold to a cavity, first and second separate fluid channels extending to convey first and second fluids from first and second fluid sources through the nozzle to the gate, an elongated hollow valve sleeve member received in the longitudinal bore of the nozzle, the valve sleeve member being axially reciprocable in the longitudinal bore between a retracted position wherein the first fluid channel is open and a forward position wherein the first fluid channel is closed, an elongated valve pin member received in the hollow valve sleeve member, the valve pin member being axially reciprocable in the valve sleeve member between a retracted position wherein the second fluid channel is open and a forward position wherein the second fluid channel is closed, the improvement wherein the apparatus comprises;

(a) first actuating mechanism which reciprocates the valve sleeve member rotatably and axially between the retracted open position and the forward closed position according to a predetermined cycle, and (b) second actuating mechanism which reciprocates the valve pin member rotatably and axially between the retracted open position and the forward closed position according to the predetermined cycle.

2. Injection molding apparatus as claimed in claim 1 wherein the gate to the cavity is in alignment with the longitudinal bore in the nozzle, a hollow nozzle seal extends around the gate to bridge an air gap between the mold and the nozzle, and the first and second fluid channels extend through the nozzle seal from the nozzle to the gate.

3. Injection molding apparatus as claimed in claim 2 wherein the valve sleeve member has a forward end which is seated in the gate when the valve sleeve member is in the forward closed position, and a forward portion with a reduced outer diameter adjacent the forward end, the first fluid channel extending around the forward portion of the valve sleeve member through the nozzle seal to the gate when the valve sleeve member is in the retracted open position, and wherein the valve pin member has a forward end which is seated in the valve sleeve member when the valve pin member is in the forward closed position, and a forward portion with a reduced outer diameter adjacent the forward end, the second fluid channel extending around the forward portion of the valve pin member through the valve sleeve member to the gate when the valve pin member is in the retracted open position.

4. Injection molding apparatus as claimed in claim 3 wherein the nozzle seal is seated in the mold and has a forward end extending through the mold to the cavity, and wherein the gate to the cavity extends through the nozzle seal.

5. Injection molding apparatus as claimed in claim 4 wherein the first actuating mechanism comprises;

(i) a first rack member mounted on the nozzle to engage first spur teeth extending around the valve sleeve member, first power means connected to drive the first rack member alternately in opposite directions whereby the valve sleeve member is rotated alternately in opposite directions, and (ii) first fixed teeth means on one of the valve sleeve member and the nozzle to engage first thread means on the other of the valve sleeve member and the nozzle, whereby the rotation of the valve sleeve member by the first rack member produces the corresponding axial movement of the valve sleeve member to reciprocate the valve sleeve member axially between the retracted open position and the forward closed position according to the predetermined cycle, and wherein the second actuating mechanism comprises;

(iii) a second rack member mounted on the nozzle to engage second spur teeth extending around the valve pin member, second power means connected to drive the second rack member alternately in opposite directions whereby the valve pin member is rotated alternately in opposite directions, and (iv) second fixed teeth means on one of the valve pin member and the nozzle to engage second thread means on the other of the valve pin member and the nozzle, whereby the rotation of the valve pin member by the second rack member produces the corresponding axial movement of the valve pin member to reciprocate the valve pin member axially between the retracted open position and the forward closed position according to the predetermined cycle.

6. Injection molding apparatus as claimed in claim 5 wherein operation of the first power means connected to drive the first rack member is accurately controlled by a first signal originating from a first transducer, the first transducer being mounted on the first actuating mechanism to produce the first signal according to the position of the first rack member, and wherein operation of the second power means connected to drive the second rack member is accurately controlled by a second signal originating from a second transducer, the second transducer being mounted on the second actuating mechanism to produce the second signal according to the position of the second rack member.

7. Injection molding apparatus as claimed in claim 6 wherein the first fixed teeth means face inwardly into the longitudinal bore in the nozzle to engage the first thread means extending around the valve sleeve member, and wherein the valve pin member has a rear portion extending rearwardly from the valve sleeve member, and the second fixed teeth means face inwardly into the longitudinal bore in the nozzle to engage the second thread means extending around the rear portion of the valve pin member.

8. Injection molding apparatus as claimed in claim 7 wherein the first and second fixed teeth means are threaded half-nuts mounted in the nozzle to respectively engage the first and second thread means.

9. Injection molding apparatus as claimed in claim 8 wherein the first fluid flowing through the first fluid channel is plastic melt, the second fluid flowing through the second fluid channel is air, and when both the valve sleeve member and the valve pin member are in the retracted open positions, the air flows through the gate into the cavity in a central stream surrounded by the plastic melt.

* * * * *